Figure 1:
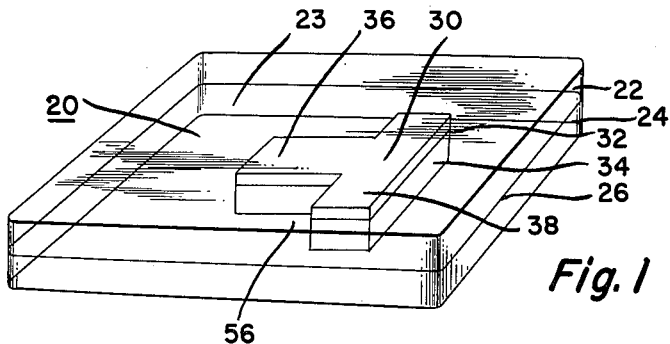

Jan. 24, 1956   R. C. DAVIS ET AL   2,731,672
METHOD OF FORMING AN ORNAMENTAL PLASTIC ARTICLE
Filed Feb. 25, 1953

INVENTOR.
Joseph H. Overwein
Raymond C. Davis
BY   Murray S. Millhouse

Their Attorneys 2,731,672
Patented Jan. 24, 1956

2,731,672
METHOD OF FORMING AN ORNAMENTAL PLASTIC ARTICLE

Raymond C. Davis, Joseph H. Overwein, and Murray S. Millhouse, Dayton, Ohio, assignors to General Motors Corporation, Detroit, Mich., a corporation of Delaware Application February 25, 1953, Serial No. 338,832

4 Claims. (Cl. 18—59)

This invention relates to plastics and more particularly to an ornamental plastic article having a design appearing in relief therein.

An object of the present invention is to provide an ornamental laminated plastic article formed from a plurality of layers of plastic material wherein a design appears to be in raised relief within the article.

Another object of the present invention is to form an ornamental laminated plastic article having a plurality of molded layers of contrasting colors wherein a design in raised relief appears within the article.

Another object of the present invention is to provide a laminated ornamental plastic article wherein a design in apparent raised relief appears therein, said article being formed by molding a plurality of layers of plastic around the type and shank portions on a terminal end of the plunger, withdrawing the plunger to form a cavity in the molded article and finally providing a contrasting surface on the walls of the cavity so formed.

A more specific object of the present invention is to form an ornamental plastic article in a plurality of molding steps wherein the steps comprise; forming a molded layer of plastic material having a design therein by molding said layer around a type end and corresponding shank of a plunger, molding a second layer around the plunger sides while simultaneously bringing the layers in intimate contact with each other, removing the plunger from the layers thereby imparting an aperture design in the second layer in substantially exact register with the design in the first layer and finally forming a contrasting surface on at least a portion of the walls of the composite design so the design appears in raised relief in the formed article when viewed from the opposite side.

Another object of the present invention is to provide a design which appears in raised relief within a laminated plastic article wherein said article is formed by a multiple step molding process, the molding steps including, first molding a layer of plastic around a portion of the shank of a plunger having a type on one end thereof, then molding a second layer around the type and remainder of the shank portion of the plunger while simultaneously integrating the formed layers together into a laminate with the designs thus formed in the various layers substantially in exact register after the plunger is removed from the mold, and finally forming a contrasting surface on the walls of the cavity formed by the plunger so the design will clearly appear in the formed laminated plastic article.

Further objects and advantages of the present invention will be apparent from the following description reference being had to the accompanying drawings wherein a preferred embodiment of the present invention is clearly shown.

In the drawings:

Fig. 1 in perspective shows a view of an ornamental design appearing in raised relief within a molded plastic article.

Figure 2:
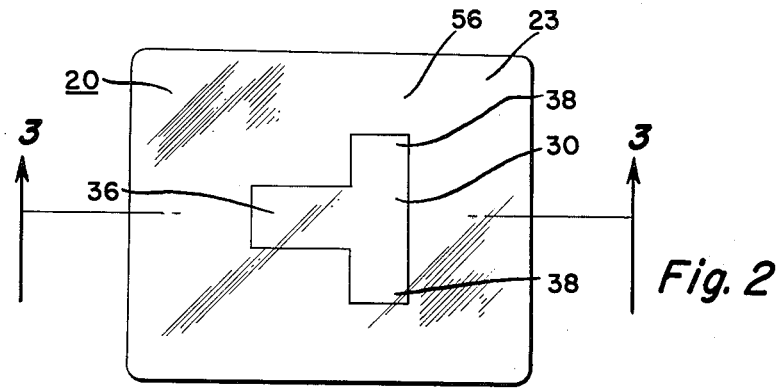

Fig. 2 is a plan view of the article in Fig. 1.

Figure 3:
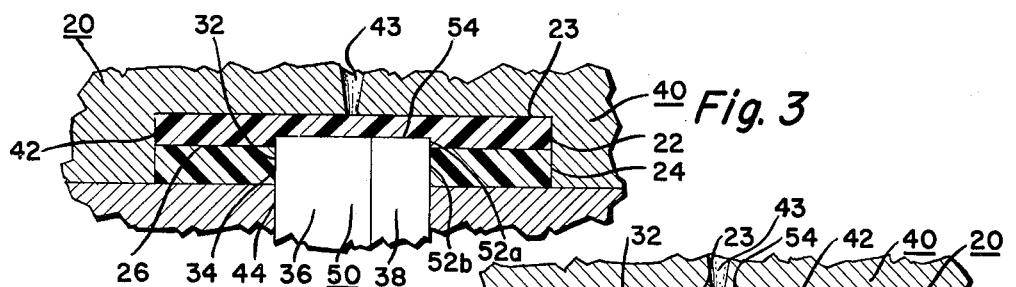

Fig. 3 diagrammatically in cross section shows a portion of a mold and plunger for molding the article shown along line 3—3 in Fig. 2.

Figure 4:
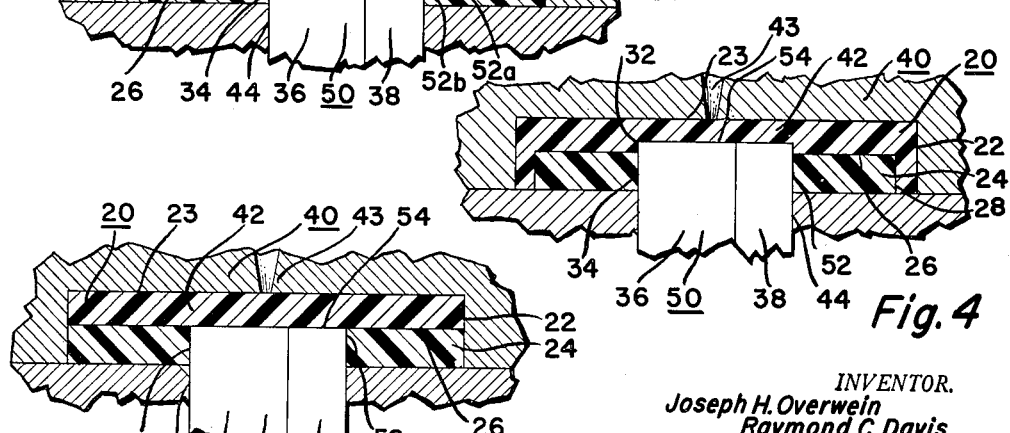

Fig. 4 shows a modification of Fig. 3.

Figure 5:
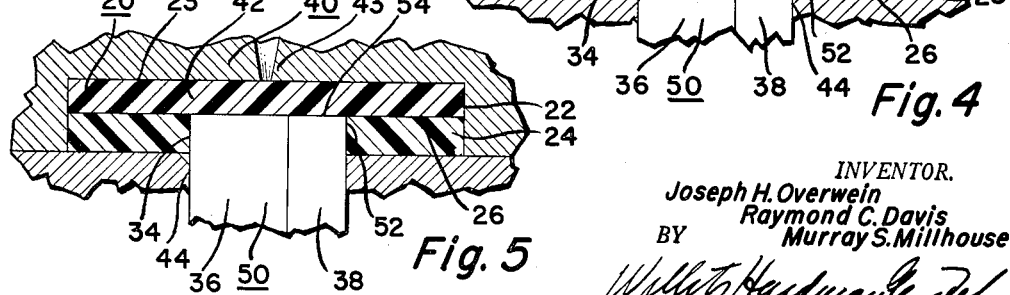

Fig. 5 diagrammatically shows a modification of Fig. 3 wherein the terminus of a plunger extends to an interface of the laminated layers.

In the drawings and more particularly in Fig. 1 a laminated plastic article 20 is shown wherein an ornamental design 30 appears in raised relief, particularly when obliquely viewed through a surface 23 of top layer 22. The laminated article 20 is composed of a top layer 22 and bottom layer 24 intimately joined to one another along an interface 26.

For the purposes of illustration, a T-shaped design is shown as formed within the plastic article 20. So that the various components of the design may be followed throughout the drawings, the numeral 36 is used to designate the leg portion of the T and 38, the extending arms therefor.

The plastic article 20 as shown in the drawings may be molded by a multiple step molding process and in the preferred form of the invention may be formed in a mold cavity 42 in a mold 40, a portion of which is diagrammatically shown in section in Figs. 3, 4 and 5 of the drawings. A plunger 50 is shown as partially extending into cavity 42 through an aperture 44 in a wall of mold 40. The shape of the plunger will determine the configuration of the design 30, that is ultimately formed in the plastic article 20. So that the function of the various portions of the plunger during the molding of article 20 may more readily be described, various portions thereof will be given reference numerals. Thus 54 indicates the terminal end portion of the plunger, which may be considered as analagous to the type portion 54 of a printing type, 52a indicates that portion of the shank adjacent the type 54 while 52b indicates that portion of the shank nearest shank portion 52a and removed from the type 54. It is to be here noted that shank portions 52a and 52b have a longitudinal configuration corresponding to the peripheral shape of the type 54 thus a design subsequently formed in each layer by the shank portions will correspond to the design formed by the type portion 54.

In one form of the invention a bottom layer 24 may be formed in a separate mold (not shown) with plunger 50 suitably inserted within the mold so as to form the layer 24 having an apertured design 34 therethrough formed by shank portion 52b of the plunger 50. It is apparent the design may also be formed utilizing other plungers providing they have a similar shape as plunger 50 and if the same plunger 50 or similar plungers are used, they may then be transferred either attached to or separate from the molded layer 24 when it is inserted within mold 40 providing the bottom layer 24 has a plunger 50 extending therethrough when the layer 24 is in position within the mold 40. After the bottom layer 24 has been formed about a portion 52b of the plunger, the top layer 22 is molded and integrally attached to the bottom layer 24 by completely filling the mold cavity 42 preferably through a sprue passage 43. It is manifest when the layers are so formed shank portion 52b will provide an apertured design 34 in bottom layer 24 and the type 54 and shank 52a portions will form a recessed design 32 in top layer 22 after the plunger is removed from the article.

It is further apparent if the plunger 50 has a type figure in the form of an intaglio or cameo, a reverse figure will be formed therefrom in the layer in contact therewith during the molding process and the depth of insertion of the plunger 50 within mold cavity 42 will influence the optical effect of the raised design 30 appearing within the article 20.

A modification of the laminated article formed is shown in Fig. 4 wherein the top layer 22 has a molded ridge 28 peripherally formed thereon. This ridge provides a recess within the top layer 22 wherein the bottom layer may be molded when the above mentioned molding process is substantially reversed, namely by having the top layer 22 formed first and having the bottom layer 24 molded in situ thereon in the manner heretofore stated.

A further modification is shown in Fig. 5 of the drawings wherein the terminus of the plunger 50 extends to the interface 26 only of the two layers 22 and 24. This arrangement will provide a design 34 in the bottom layer only and the figure thus formed will appear in lower relief when obliquely viewed through surface 23 of the top layer 22.

After the foregoing molding process has been completed, the article 22 may be removed from the mold. The designs 32 and 34 formed by the various portions of plunger 50 will be substantially in exact register with each other and will appear as a cavity in article 20 when viewed from the back or bottom layer 24 side of the article. The entire back or merely the cavity portion of the article 20 may then be treated by painting, metal evaporation, sandblasting or any other suitable method so as to form a contrasting appearing surface 56 thereon. This treatment will further enhance the appearance of the design 30 appearing in raised relief within article 20. Thus providing an article usable as a name-plate, insignia, escutcheon, etc., and it is apparent if a suitably shaped plunger is employed a wide variety of designs will be achieved i. e. trade names, trademarks and any other design which can be included on the end of a plunger.

It is manifest, the method of attachment or the sequence of molding the various layers will not appreciably effect the appearance of the design within the molded article. Thus the layers may be individually formed in different molds and later joined by some suitable transparent cement or other well known joining method without appreciably detracting from the optical effect of the design 30, providing the designs in each layer are substantially in exact register with each other. Therefore it follows that a multiple-layered article having three or more layers may be formed wherein each of the layers may have the same or a contrasting color, if desired. Further the same layer may have more than one color if a suitably divided mold is employed.

Any suitable plastic material such as polystyrene, methyl methacrylate acetates and the like may be used as a molding material wherein one layer at least must be translucent.

In some instances more than one plunger may be used simultaneously in the same mold so as to provide a multiplicity of designs appearing in raised relief within the laminated article all of such modification coming within the scope of our invention.

While the embodiment of the present invention as herein disclosed constitutes a preferred form, it is to be understood that other forms might be adopted.

What is claimed is as follows:

1. In a method of forming an ornamental design in a layered plastic article wherein the design appears in relief within the layers of the article, the steps comprising; molding a first part of colored plastic material having an apertured design extending therethrough, inserting a plunger having a predetermined contour through said aperture, molding a second part of a material that contrasts with said first part upon the first part so that a surface portion of the second part is in contact with a portion of a terminal end of said plunger and in intimate contact with at least a portion of one surface of the first part, removing said plunger from said aperture and finally forming a surface contrasting in color to the materials of both layers on at least a portion of the second part formerly in contact with the terminal end of the plunger.

2. In a method of forming an ornamental plastic article of a plurality of layers wherein an ornamental design appears in raised relief, the steps comprising; molding a layer of plastic material about the shank of a plunger to form an apertured design in and extending through said layer, molding a second layer of plastic material contrasting in color to said first layer on said first layer and about the terminal end of said plunger to form a recessed design in said second layer, withdrawing said plunger from said layers to provide a composite design from the recessed design and said apertured design and finally forming a surface that contrasts to the optical appearance of the material in both layers on said composite design.

3. In a method of forming an ornamental plastic article of a plurality of different colored plastic layers wherein an ornamental design appears in raised relief in at least two layers of said article when said design is viewed through one of said layers, the steps comprising; molding at least two layers one upon the other wherein one of said layers is formed of colored material and is molded around the shank of a plunger to provide an apertured design in and extending through said layer and an outer layer of a transparent material is molded around the terminal end of said plunger to provide a recessed design in said outer layer which is in alignment with the apertured design when said plunger is withdrawn from said layers, and forming a coating that optically contrasts to the material of both layers on the surface portions of said layers which define the recessed and apertured designs whereby said contrasting surface appears as a design as formed in raised relief within both of said layers when said design is viewed through the transparent material of said outer layer.

4. In a method of forming an ornamental plastic article of a plurality of different layers of plastic material wherein a design appears in raised relief as formed in said layers when said design is viewed through one of said layers, the steps comprising; molding a part of transparent plastic material with a recess and a recessed design within said recess, inserting a plunger into said recessed design and molding a second part within said recess and around a portion of the shank of said plunger, to provide an apertured design extending through said second part that is aligned with the recessed design in said first part, withdrawing said plunger from said apertured design and recessed design to provide a composite design that extends into both of said parts and finally forming a metalized surface on the composite design so that the composite design appears in both parts when viewed through the transparent material of said first part.

References Cited in the file of this patent

UNITED STATES PATENTS

| | | |
|---|---|---|
| 2,354,857 | Gits et al. | Aug. 1, 1944 |
| 2,463,370 | Flaster | Mar. 1, 1949 |
| 2,609,570 | Danielson et al. | Sept. 9, 1952 |